US007453372B2

(12) United States Patent
Hentati et al.

(10) Patent No.: US 7,453,372 B2
(45) Date of Patent: Nov. 18, 2008

(54) IDENTIFICATION OF THE CHANNEL FREQUENCY RESPONSE USING CHIRPS AND STEPPED FREQUENCIES

(75) Inventors: Nabil Hentati, Niedersachsen (DE); Hanno Reckmann, Wathlingen (DE); Ingolf Wassermann, Hannover (DE)

(73) Assignee: Baker Hughes Incorporated, Houston, TX (US)

( * ) Notice: Subject to any disclaimer, the term of this patent is extended or adjusted under 35 U.S.C. 154(b) by 248 days.

(21) Appl. No.: 11/284,319

(22) Filed: Nov. 21, 2005

(65) Prior Publication Data

US 2006/0114747 A1 Jun. 1, 2006

Related U.S. Application Data

(60) Provisional application No. 60/631,439, filed on Nov. 29, 2004, provisional application No. 60/629,990, filed on Nov. 22, 2004.

(51) Int. Cl.
*G01V 1/00* (2006.01)
(52) U.S. Cl. .............. 340/853.2; 340/853.7; 367/83
(58) Field of Classification Search .......... 340/853.2, 340/853.7; 367/83
See application file for complete search history.

(56) References Cited

U.S. PATENT DOCUMENTS

| 4,314,364 | A | 2/1982 | Bickel | 367/43 |
|---|---|---|---|---|
| 5,055,837 | A | 10/1991 | Abdallah et al. | 340/853 |
| 5,113,379 | A | 5/1992 | Scherbatskoy | 367/83 |
| 5,124,953 | A | 6/1992 | Grosso | 367/82 |
| 5,592,438 | A * | 1/1997 | Rorden et al. | 367/83 |
| 5,850,369 | A | 12/1998 | Rorden et al. | 367/83 |
| 5,966,169 | A | 10/1999 | Bullis | 348/81 |
| 6,509,866 | B2 | 1/2003 | Prince | 324/196 |
| 6,626,253 | B2 | 9/2003 | Hahn et al. | 175/48 |
| RE38,567 | E | 8/2004 | Gruenhagen | 340/679 |
| 6,795,373 | B1 | 9/2004 | Aronstam | 367/85 |
| 6,953,434 | B2 | 10/2005 | Hao et al. | 600/458 |
| 6,985,815 | B2 | 1/2006 | Castagna et al. | 702/14 |
| 2003/0142586 | A1* | 7/2003 | Shah et al. | 367/82 |
| 2003/0151975 | A1 | 8/2003 | Zhou et al. | 367/31 |
| 2005/0022987 | A1* | 2/2005 | Green et al. | 166/250.17 |

OTHER PUBLICATIONS

H.K. Kytomaa et al., *An Acoustic Model of Drilling Fluid Circuits for MWD Communication*, SPE28015, XP-002370584, Mar. 1994, pp. 1-22.

J.V. Leggett III et al., *A New Method for Communicating Downhole Sensor Data Within the Annulus of a Production Well*, SPE 28522, SPE 69th Annual Technical Conference and Exhibition, New Orleans, LA, Sep. 25-28, 1994, pp. 33-42, 8 Figs.

* cited by examiner

*Primary Examiner*—Timothy Edwards, Jr.
(74) *Attorney, Agent, or Firm*—Madan, Mossman & Sriram, P.C.

(57) ABSTRACT

The transfer function of the communication channel in a mud pulse telemetry system is determined by sending a known signal through the channel and spectral analysis of the received signal. The known signal may be a chirp signal or a stepped frequency signal. Based on the determined transfer function, operating parameters of the pulser are adjusted.

38 Claims, 11 Drawing Sheets

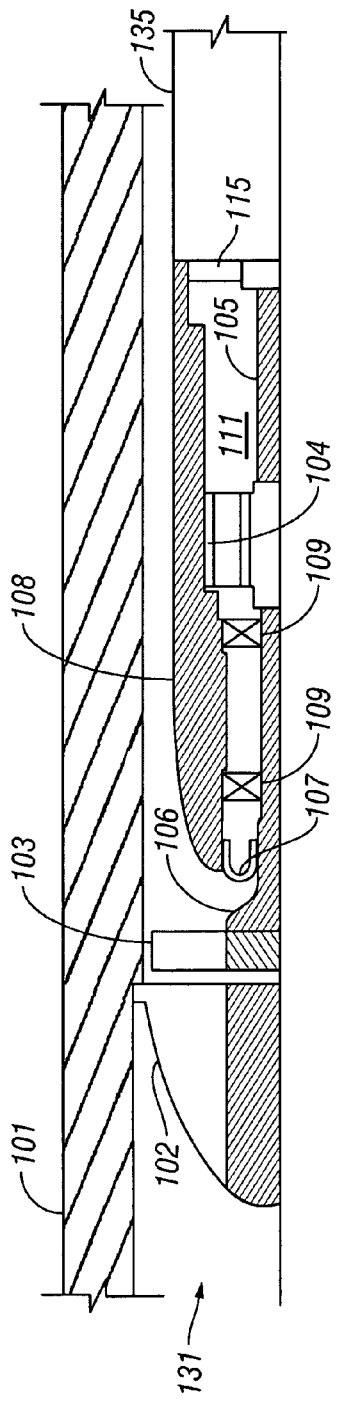
FIG. 2a
(Prior Art)
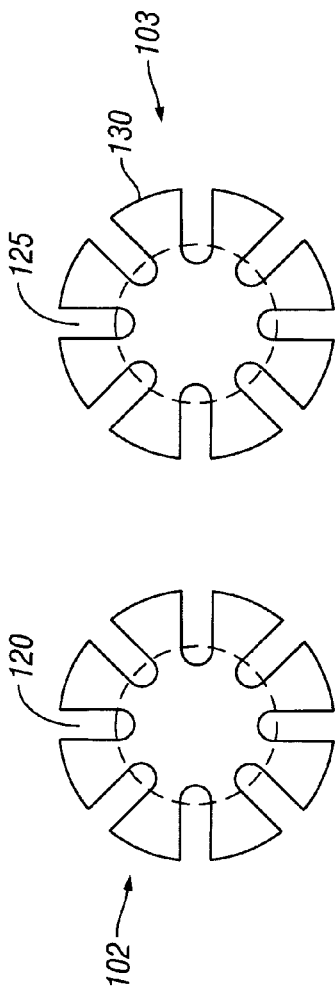
FIG. 2b
(Prior Art)
FIG. 2c
(Prior Art)

IDENTIFICATION OF THE CHANNEL FREQUENCY RESPONSE USING CHIRPS AND STEPPED FREQUENCIES

CROSS-REFERENCES TO RELATED APPLICATIONS

This application claims priority from U.S. Provisional Patent Application Ser. No. 60/629,990 filed on 22 Nov. 2004 and U.S. Provisional Patent Application Ser. No. 60/631,439 filed on 29 Nov. 2004.

BACKGROUND OF THE INVENTION

1. Field of the Invention

The present invention relates to telemetry systems for communicating information from a downhole location to a surface location, and, more particularly, to a method of determining channel characteristics of a mechanical telemetry system such as a mud pulse telemetry system. The term "mechanical" as used herein relates to telemetry governed by, or in accordance with the principles of mechanics, including acoustics and fluid mechanics.

2. Description of the Related Art

Drilling fluid telemetry systems, generally referred to as mud pulse systems, are particularly adapted for telemetry of information from the bottom of a borehole to the surface of the earth during oil well drilling operations. The information telemetered often includes, but is not limited to, parameters of pressure, temperature, direction and deviation of the well bore. Other parameters include logging data such as resistivity of the various layers, sonic density, porosity, induction, self-potential and pressure gradients. This information is critical to efficiency in the drilling operation.

MWD Telemetry is required to link the downhole MWD components to the surface MWD components in real-time, and to handle most drilling related operations without breaking stride. The system to support this is quite complex, with both downhole and surface components that operate in step.

In any telemetry system there is a transmitter and a receiver. In MWD Telemetry the transmitter and receiver technologies are often different if information is being up-linked or down-linked. In up-linking, the transmitter is commonly referred to as the Mud-Pulser (or more simply the Pulser) and is an MWD tool in the BHA that can generate pressure fluctuations in the mud stream. The surface receiver system consists of sensors that measure the pressure fluctuations and/or flow fluctuations, and signal processing modules that interpret these measurements.

Down-linking is achieved by either periodically varying the flow-rate of the mud in the system or by periodically varying the rotation rate of the drillstring. In the first case, the flow rate is controlled using a bypass-actuator and controller, and the signal is received in the downhole MWD system using a sensor that is affected by either flow or pressure. In the second case, the surface rotary speed is controlled manually, and the signal is received using a sensor that is affected.

For uplink telemetry, a suitable pulser is described in U.S. Pat. No. 6,626,253 to Hahn et al., having the same assignee as the present application and the contents of which are fully incorporated herein by reference. Described in Hahn '253 is an anti-plugging oscillating shear valve system for generating pressure fluctuations in a flowing drilling fluid comprising a stationary stator and an oscillating rotor, both with axial flow passages. The rotor oscillates in close proximity to the stator, at least partially blocking the flow through the stator and generating oscillating pressure pulses. The rotor passes through two zero speed positions during each cycle, facilitating rapid changes in signal phase, frequency, and/or amplitude facilitating enhanced data encoding.

U.S. Pat. No. RE38,567 to Gruenhagen et al., having the same assignee as the present invention and the contents of which are fully incorporated herein by reference, and U.S. Pat. No. 5,113,379 to Scherbatskoy teach methods of downlink telemetry in which flow rate is controlled using a bypass-actuator and controller.

There are two groups of signals that are used in the transmission of information: baseband and passband. The transmission of information in a sequence of pressure pulses is known as baseband signaling. If the pulses are further modulated by a carrier signal, which shifts the transmission bandwidth higher in frequency, then this is known as passband signaling. The particular examples taught in Gruenhagen are baseband signaling. Hahn '253, on the other hand, also teaches the use passband signaling with different types of modulation techniques such as Frequency Shift Keying (FSK), Phase Shift Keying (PSK) and Amplitude Shift Keying (ASK). U.S. patent application Ser. No. 10/223,169 of Hahn et al., having the same assignee as the present invention and the contents of which are fully incorporated herein by reference, further teaches use of multivalent coding, and chirp signals for uplink telemetry. It should be noted that passband signaling can also be used for downlink telemetry with the method of Gruenhagen. Scherbatksoy discloses a system in which a narrow band signal is modulated by square pulses representative of the data to be transmitted.

Baseband signaling is affected by torque noise and the stick-slip behavior of the drillstring. By using passband signaling we can move the signal clear of this noise source. The passband frequency bandwidth, however, is also not free of noise sources: for example, pump noise can play a major role in distorting the signal. But if the contaminating noise is generated by the pumps then we can independently quantify it and filter it out from our measurements. In summary, by using passband signaling we gain control over the frequency bandwidth occupied by the information carrying signal, and can better cancel noise that may be distorting this signal.

In passband filtering, one of the central issues is the selection of frequencies at which the signal is to be transmitted. The present invention addresses this issue.

Another problem addressed in this invention is not limited to borehole telemetry applications and occurs wherever mechanical vibrators are used to generate swept frequency signals. The problem is that of harmonic distortion wherein the mechanical vibrator generates one or more harmonics of the fundamental frequencies. The received signals are cross-correlated with the reference sweep signal to get an impulse response of the channel. In the presence of harmonics, the processed signal may be severely affected by harmonic distortion. A method for attenuating harmonic correlation noise caused by harmonic energy output from seismic vibrators was developed by Reitsch as disclosed in U.S. Pat. No. 4,042,910. The method includes the step of generating a plurality of sweep signals in series and with the phase of each succeeding sweep signal being shifted relative to the previous one by a predetermined phase angle that is a fraction of $2\pi$. The generated signals are separately recorded and transformed by inverse phase shifting before being added or stacked in a conventional manner. The generation of multiple sweeps is time-consuming and the phase encoding adds to the complexity of the system. The problem of harmonic distortion also occurs (but is not addressed) in US20030151975 of Thomann et al. in seismic-while-drilling applications. The problem also occurs in cross-well tomography where swept frequency sources are used. The present invention addresses the problem of harmonic distortion without the need for multiple sweeps or phase encoding ot the signals.

SUMMARY OF THE INVENTION

The present invention comprises a method of communicating signals in a wellbore between a surface location and a downhole location. A mechanical signal is generated at one of the surface location and the downhole location. A signal indicative of the generated mechanical signal is received at the other of the surface and downhole locations. A characteristic of a communication channel between the surface and downhole locations is determined from the received signal and the generated mechanical signal. The generated mechanical signal may be an alteration of a fluid flow and/or a pressure pulse. received signal may include a measurement of a pressure and/or a fluid flow. In one embodiment of the invention, the generated mechanical signal may be a stepped frequency signal. Alternatively, a reference chirp signal may be used as the basis for the generated mechanical signal. The communication channel may be a mud flow path. The determined characteristic may be a transfer function. The transfer function may be determined by cross-correlating the received signal with the reference chirp signal, using a frequency spectrum of the received signal, and, using a frequency spectrum of the reference chirp signal. Once the characteristic of the channel has been determined, it may be used for selecting an operating frequency for communication of instructions from the surface location to the downhole location and data from the downhole location to the surface location. The determination of the transfer function may be made based on signals transmitted during a pause in drilling operations.

Another embodiment of the invention is a system for communicating signals in a wellbore between a surface location and a downhole location. The system includes a mechanical source which generates a mechanical signal at one of the surface location and downhole location. A receiver at the other location receives a signal indicative of the generated mechanical signal. A processor determines from the received signal and the generated mechanical signal a characteristic of a communication channel between the surface and downhole locations. The mechanical source may be a pulser including an oscillating shear valve. The mechanical signal generated by the source may be an alteration of a fluid flow and/or a pressure pulse. The receiver may be a hydrophone, a dual pressure transducer and/or a flow meter. The generated mechanical signal may be a stepped frequency signal or may be derived from a chirp signal. The communication channel may be a mud flow path. The determined characteristic of the communication channel may be a transfer function. The processor determines the characteristic by at least one of cross-correlating the received mechanical signal with the reference signal, determining a frequency spectrum of the received signal and, determining a frequency spectrum of the reference signal. Based on the determined characteristic, the processor selects an operating frequency for communication between the surface and downhole locations. The processor may be at the downhole location and the mechanical source may be part of a bottomhole assembly (BHA). The determination of the characteristic may be done by generating the mechanical signal during a pause in drilling operations.

Another embodiment of the invention is a computer readable medium for use with a system for communicating signals between a surface location and a downhole location. The system includes a mechanical source which generates a mechanical signal and a receiver which receives a signal indicative of the generated signal. The medium includes instructions which enable a processor to estimate from the received signal and the generated mechanical signal a characteristic of the communication channel between the surface and downhole locations. The computer readable medium may be at least one of a ROM, an EPROM, an EAROM, a flash memory, and an optical disk.

Another embodiment of the invention is a method of determining a characteristic of a communication channel associated with an earth formation. A swept frequency signal is generated using a mechanical device and propagated in the channel. The propagating signal includes a harmonic distortion. The propagating signal is received, the received signal being responsive to the characteristic of the channel. The received signal is then processed to estimate the characteristic of the channel by a processing method that includes a chirp transform. The communication channel may be a borehole in the earth formation. The characteristic may be the impulse response of the channel. The mechanical device may be at a surface location, within a body of water, within a borehole in the earth formation, and/or on a bottomhole assembly conveyed in a borehole in the earth formation. The chirp transform may include correlation with a conjugate of the swept frequency signal, a low pass filtering and a correlation with the swept frequency signal. The parameters of the low pass filtering may be based on a chirp rate of the swept frequency signal and a maximum delay in the channel.

Another embodiment of the invention is a system for determining a characteristic of a communication channel associated with an earth formation. The system includes a mechanical device which generates a swept frequency signal which propagates in the channel, the propagating signal including a harmonic. A receiver produces a received signal responsive to the characteristic of the channel. A processor estimates the characteristic of the channel from the received signal by using chirp transform in the processing. The communication channel may be a borehole in the earth formation. The characteristic may be the impulse response of the channel. The mechanical device may be positioned at a surface location, within a body of water, within a borehole in the earth formation, and/or on a bottomhole assembly conveyed in a borehole in the earth formation. The processor may apply the chirp transform by further performing a correlation with a conjugate of the swept frequency signal, a low pass filtering and a correlation with the swept frequency signal. The processor may select a chirp rate of the low pass filtering based on a chirp rate of the swept frequency signal and a maximum delay in the channel.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein:

FIGS. 2a-2c (prior art) is a schematic of an oscillating shear valve suitable for use with the present invention;

DETAILED DESCRIPTION OF THE INVENTION

Figure 1:
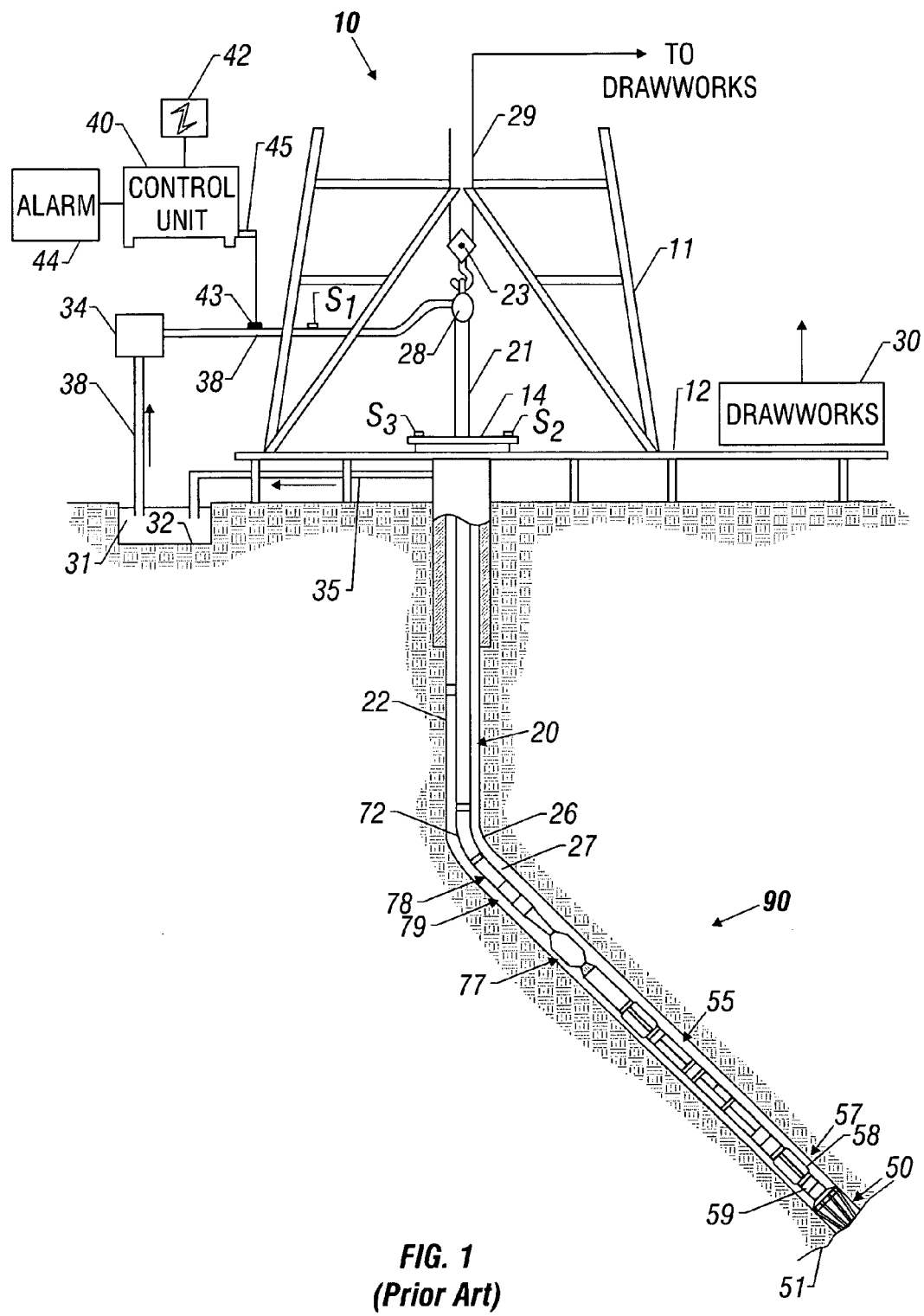
FIG. 1 (prior art) is a schematic illustration of a drilling system suitable for use with the present invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 38 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ typically placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the invention, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In an exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the invention, a drilling sensor module 59 is placed near the drill bit 50. The drilling sensor module contains sensors, circuitry and processing software and algorithms relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur. The system also includes a downhole processor, sensor assembly for making formation evaluation and an orientation sensor. These may be located at any suitable position on the bottom hole assembly (BHA).

FIG. 2a is a schematic view of the pulser, also called an oscillating shear valve, assembly 19, for mud pulse telemetry. The pulser assembly 19 is located in the inner bore of the tool housing 101. The housing 101 may be a bored drill collar in the bottom hole assembly 10, or, alternatively, a separate housing adapted to fit into a drill collar bore. The drilling fluid 31 flows through the stator 102 and rotor 103 and passes through the annulus between the pulser housing 108 and the inner diameter of the tool housing 101.

The stator 102, see FIGS. 2a and 2b, is fixed with respect to the tool housing 101 and to the pulser housing 108 and has multiple lengthwise flow passages 120. The rotor 103, see FIGS. 2a and 2c, is disk shaped with notched blades 130 creating flow passages 125 similar in size and shape to the flow passages 120 in the stator 102. Altenatively, the flow passages 120 and 125 may be holes through the stator 102 and the rotor 103, respectively. The rotor passages 125 are adapted such that they can be aligned, at one angular position with the stator passages 120 to create a straight through flow path. The rotor 103 is positioned in close proximity to the stator 102 and is adapted to rotationally oscillate. An angular displacement of the rotor 103 with respect to the stator 102 changes the effective flow area creating pressure fluctuations in the circulated mud column. To achieve one pressure cycle it is necessary to open and close the flow channel by changing the angular positioning of the rotor blades 130 with respect to the stator flow passage 120. This can be done with an oscillating movement of the rotor 103. Rotor blades 130 are rotated in a first direction until the flow area is fully or partly restricted. This creates a pressure increase. They are then rotated in the opposite direction to open the flow path again. This creates a pressure decrease. The required angular displacement depends on the design of the rotor 103 and stator 102. The more flow paths the rotor 103 incorporates, the less the angular displacement required to create a pressure fluctuation is. A small actuation angle to create the pressure drop is desirable. The power required to accelerate the rotor 103 is proportional to the angular displacement. The lower the angular displacement is, the lower the required actuation power to accelerate or decelerate the rotor 103 is. As an example, with eight flow openings on the rotor 103 and on the stator 102, an angular displacement of approximately 22.5° is used to create the pressure drop. This keeps the actuation energy relatively small at high frequencies. Note that it is not necessary to completely block the flow to create a pressure pulse and therefore different amounts of blockage, or angular rotation, create different pulse amplitudes.

The rotor 103 is attached to shaft 106. Shaft 106 passes through a flexible bellows 107 and fits through bearings 109 which fix the shaft in radial and axial location with respect to housing 108. The shaft is connected to a electrical motor 104, which may be a reversible brushless DC motor, a servomotor, or a stepper motor. The motor 104 is electronically controlled, by circuitry in the electronics module 135, to allow the rotor 103 to be precisely driven in either direction. The precise control of the rotor 103 position provides for specific shaping of the generated pressure pulse. Such motors are commercially available and are not discussed further. The electronics module 135 may contain a programmable processor which can be preprogrammed to transmit data utilizing any of a number of encoding schemes which include, but are not limited to, Amplitude Shift Keying (ASK), Frequency Shift Keying (FSK), or Phase Shift Keying (PSK) or the combination of these techniques.

In one embodiment of the invention, the tool housing 101 has pressure sensors, not shown, mounted in locations above and below the pulser assembly, with the sensing surface exposed to the fluid in the drill string bore. These sensors are powered by the electonics module 135 and can be for receiving surface transmitted pressure pulses. The processor in the electronics module 135 may be programmed to alter the data encoding parameters based on surface transmitted pulses. The encoding parameters can include type of encoding scheme, baseline pulse amplitude, baseline frequency, or other parameters affecting the encoding of data.

The entire pulser housing 108 is filled with appropriate lubricant 111 to lubricate the bearings 109 and to pressure compensate the internal pulser housing 108 pressure with the downhole pressure of the drilling mud 31. The bearings 109 are typical anti-friction bearings known in the art and are not described further. In one embodiment, the seal 107 is a flexible bellows seal directly coupled to the shaft 106 and the pulser housing 108 and hermetically seals the oil filled pulser housing 108. The angular movement of the shaft 106 causes the flexible material of the bellows seal 107 to twist thereby accommodating the angular motion. The flexible bellows material may be an elastomeric material or, alternatively, a fiber reinforced elastomeric material. It is necessary to keep the angular rotation relatively small so that the bellows material will not be overstressed by the twisting motion. In an alternate preferred embodiment, the seal 107 may be an elastomeric rotating shaft seal or a mechanical face seal.

In one embodiment, the motor 104 is adapted with a double ended shaft or alternatively a hollow shaft. One end of the motor shaft is attached to shaft 106 and the other end of the motor shaft is attached to torsion spring 105. The other end of torsion spring 105 is anchored to end cap 115. The torsion spring 105 along with the shaft 106 and the rotor 103 comprise a mechanical spring-mass system. The torsion spring 105 is designed such that this spring-mass system is at its natural frequency at, or near, the desired oscillating pulse frequency of the pulser. The methodology for designing a resonant torsion spring-mass system is well known in the mechanical arts and is not described here. The advantage of a resonant system is that once the system is at resonance, the motor only has to provide power to overcome external forces and system dampening, while the rotational inertia forces are balanced out by the resonating system.

As noted above, in passband signaling, it would be desirable to select frequency band(s) in which noise is low and attenuation of the signal by the channel is less. By selecting the frequency band(s) based on this criterion, signal to noise (SNR) can be maximized for a given power consumption by the pulser.

This selection can be based on the transfer function of a channel, i.e., what happens to the signal between being input to the mud channel downhole, and being received at the surface. This can be modeled as a black-box: we put a signal in at one end of the box and we receive a signal at the other end. By comparing the input and output we develop a model, a black-box model, of the system that describes what changes it imparts to signals.

Figure 3:
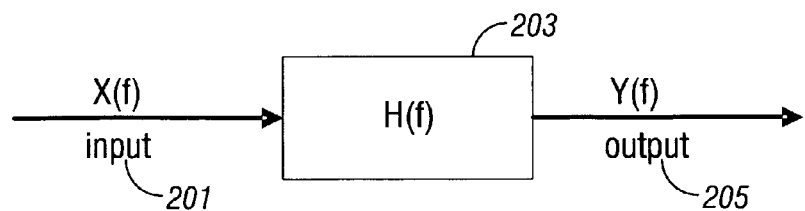
FIG. 3 is an illustration of the channel transfer function.

The system transfer function is depicted schematically in FIG. 3. Shown is an input signal 201 having a frequency spectrum X(f). In the present example, this is a known signal generated by the mud pulser. The mud channel 203 has a transfer function H(f) in the frequency domain. The received signal 205 has a spectrum Y(f). The different spectra are related by $$Y(f)=X(f) \cdot H(f) \tag{1},$$

or, equivalently, in the time domain, $$Y(t)=X(t) \otimes H(t) \tag{2},$$

where $\otimes$ represents a convolution operator. The convolution operation is given by $$Y(t)=\int H(\tau)X(t-\tau)d\tau \tag{3}.$$

The concept of a transfer function to represent a telemetry channel has been discussed in the context of EM telemetry in U.S. Pat. No. 6,781,521 to Gardner. The method of Gardner is based not on determining the transfer function but on use of adaptive filters that correct for EM noises. There are several methods for determining the transfer function H(f) that characterizes the channel.

In one embodiment of the invention, the signal X(t) is a chirp signal. An example of a chirp signal is one which occupies a period of time during which the frequency is increased or decreased continuously; it is a continuous frequency sweep between a start and an end frequency. In the time domain, an upsweep is illustrated by 205 in FIG. 4a. The frequency domain equivalent is shown by 207 in FIG. 4b. As seen in FIG. 4b, the frequency for the example increases linearly from an angular value $\omega_1$ to a value of $\omega_2$. It is not necessary that the frequency change linearly with time: nonlinear sweep frequencies may be used to selectively emphasize energy in some spectral bands over others. Other criteria that may be used are to get a spectrum with reduced sidelobes: see, for example, U.S. Pat. No. 5,347,494 to Andersen.

Figure 4A:
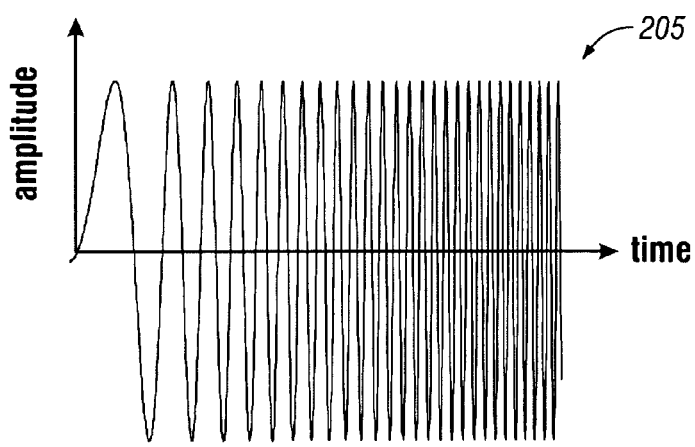
FIGS. 4a and 4b are time and frequency domain representations of a chirp signal.
Figure 4B:
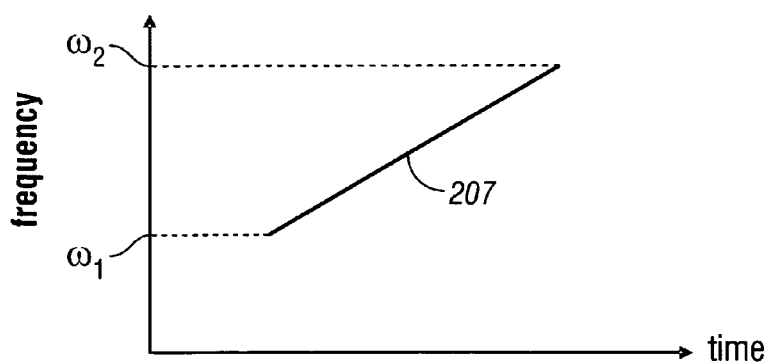

In one embodiment of the invention, a chirp signal X(t) having the characteristics of FIGS. 4a-4b is generated by the pulser. At a surface location, the signal Y(t) after passing through the mud channel is measured. The cross-correlation of X(t) and Y(t), is given by $$R_{xy}(t) = \int X(t)Y(t+\tau)d\tau \qquad (4).$$

Comparison of this cross-correlation with the autocorrelation of the chirp signal $R_{xx}(t)$ gives the transfer function H(t) or H(f) using known methods. One method is to compute the frequency spectra of the cross-correlation and divide by the frequency spectrum of the autocorrelation:

$$H^*(f) = \frac{R_{xy}(f)}{R_{xx}(f)}. \qquad (5)$$

A particular advantage of using a chirp signal downhole is that if the frequency band $\omega_1$ to $\omega_2$ is sufficiently large, the autocorrelation is a unit spike in the time domain. For band limited chirp signals, the autocorrelation is the sync function. Alternatively, conventional frequency analysis may be carried out of the transmitted and received signals and a spectral ratio determined.

Figure 5A:
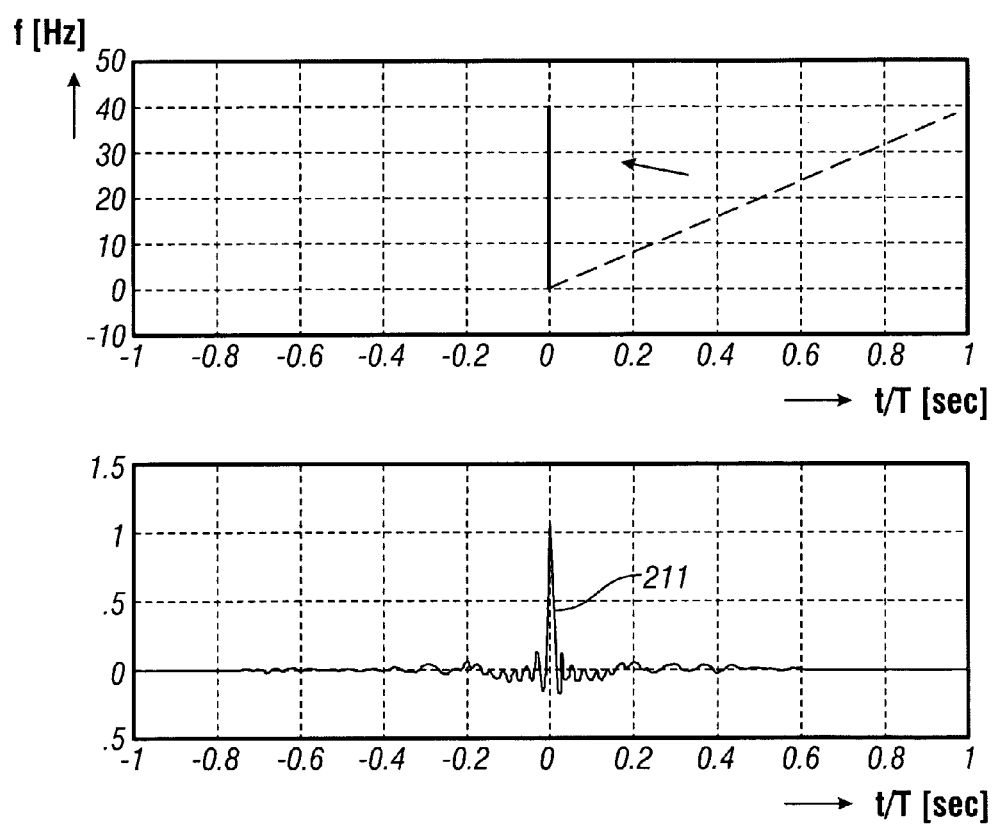
FIGS. 5a and 5b illustrate some properties of a chirp signal.
Figure 5B:
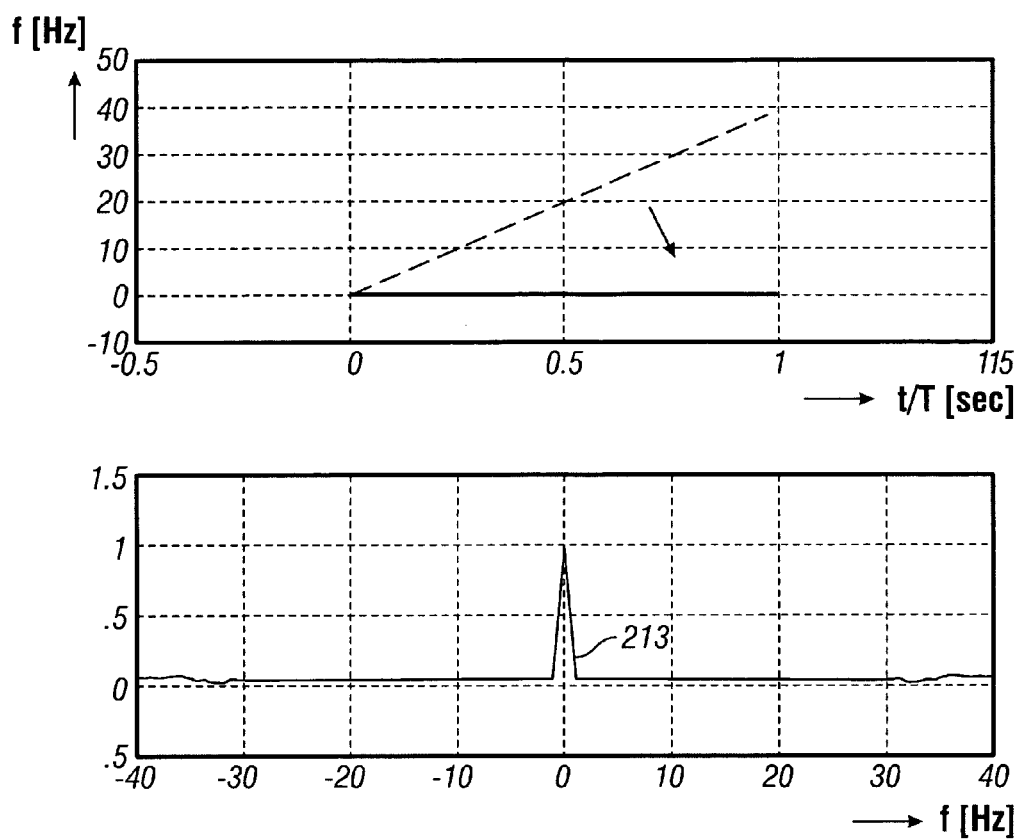

Chirps have the important characteristic of being compressible in the time domain as well as in the frequency domain. Chirp-compression is done by the correlation operation. The autocorrelation of a chirp results in a very sharp and high amplitude pulse. See 211 in FIG. 5a. The same operation in frequency domain gives a high peak at frequency 0 Hz. See 213 in FIG. 5b. The autocorrelation function gathers (compresses) most of the energy of the chirp signal at one point. Chirp-compression means a projection of the frequency curve on to the vertical axis, in case of time domain correlation and on to the horizontal axis in case of frequency domain correlation.

Figure 6:
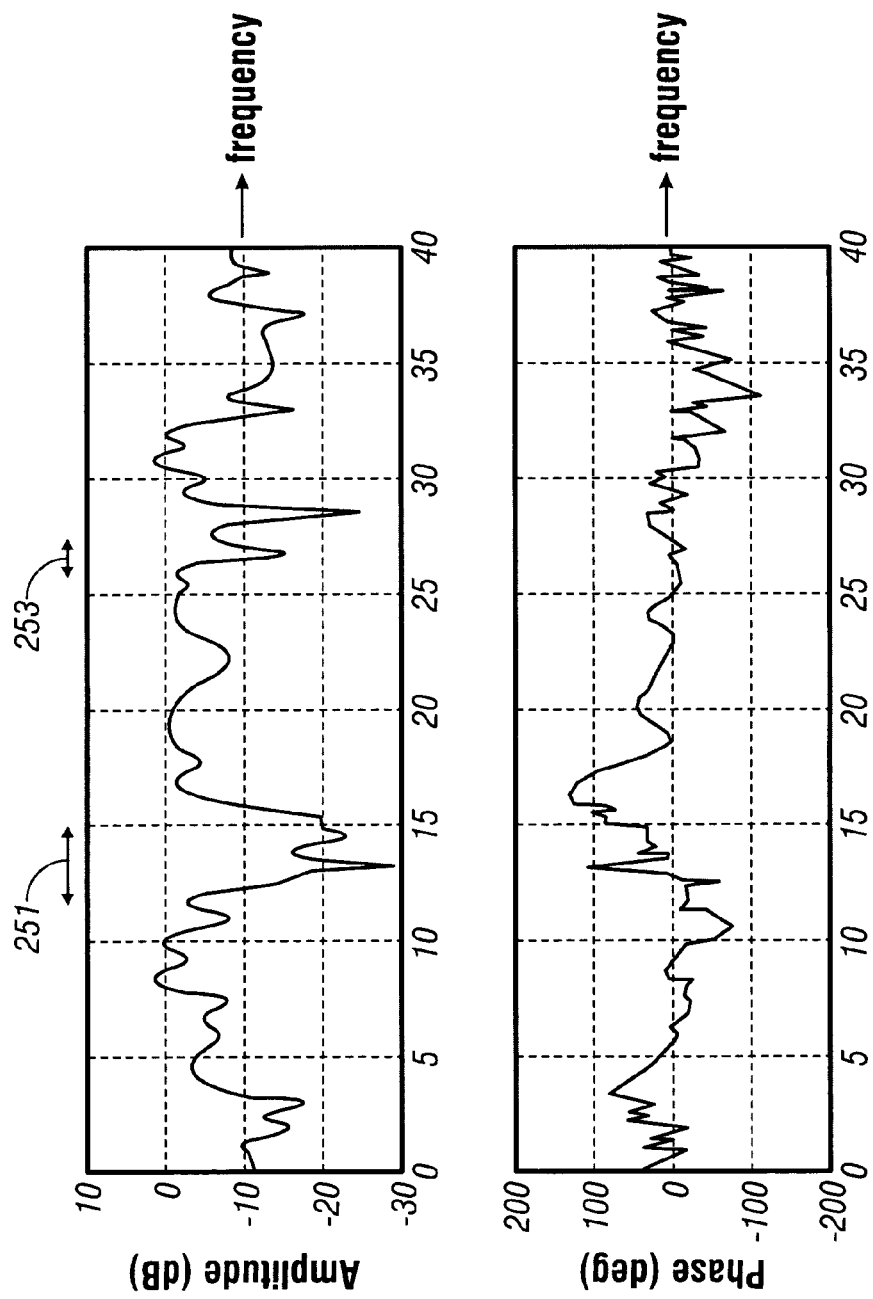
FIG. 6 shows an example of a channel transfer function for a mud pulse telemetry system derived using a chirp signal.

FIG. 6 shows the results of such a determination of the transfer function using a 1-40 Hz chirp signal. As can be seen, there are bands 251, 253 around 15 Hz and 28.5 Hz where the channel is highly attenuative. Accordingly, signals in those frequency bands should be avoided.

Figure 7A:
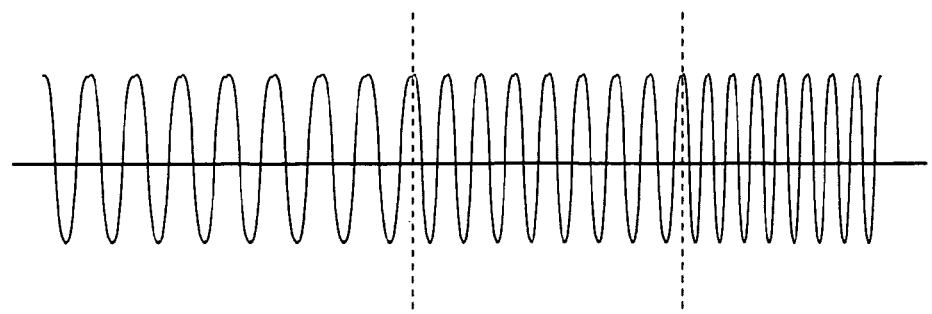
FIGS. 7a and 7b are time and frequency domain representations of a stepped frequency signal.
Figure 7B:
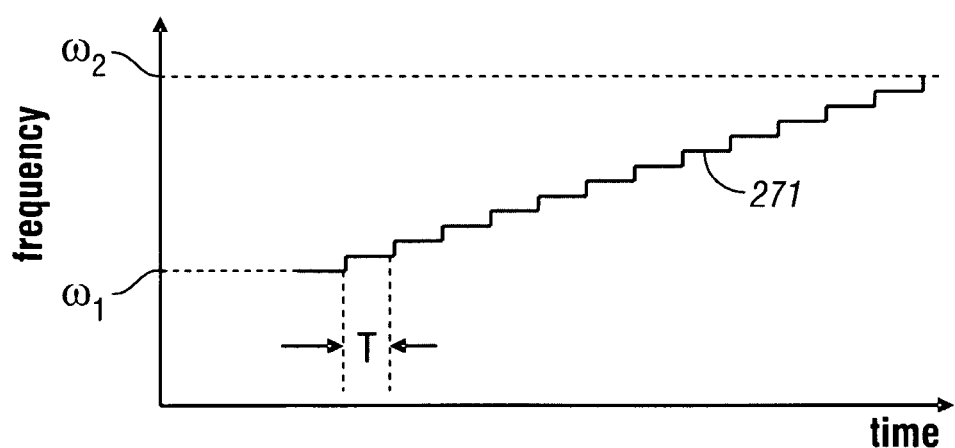

In an alternate embodiment of the invention, instead of using a chirp signal, a stepped-frequency sweep occupies a period of time during which the frequency is increased in steps, and each frequency step is held for a defined period of time. Such a stepped frequency signal with three different frequency steps is shown in FIG. 7a while FIG. 7b shows how the frequencies are stepped over a time interval. The time scale in FIG. 7b is different from that of FIG. 4b. The time duration of each step and the number of steps between a defined start and end frequency, are all programmable. The sequence is known ahead of time. With this method, the transfer function is determined with discrete bands defined by the different steps. One advantage of the stepped method is that it is less sensitive to synchronization errors and intersymbol interference (ISI) since each frequency extends over a large time duration T (see FIG. 7b). By selecting the time interval to be sufficiently large, there will be windows in which the ISI will be small or zero. A disadvantage of the stepped method is that the sweep extends over a large time duration and thus cannot be used when real time data are required. With the chirp method, the time duration can be shorter, but the estimates are not as robust. The chirp method has the advantage of giving a finer sampling in the frequency domain. The use of a stepped frequency signal for determining optimal frequencies for acoustic telemetry through a drillstring is discussed in U.S. Pat. No. 5,124,953 to Grosso; however, in Grosso, the selection is made based on a modeled transfer function of the drillstring, not on a measured transfer function.

In yet another embodiment of the invention, a pseudo-random sequence, possible a pseudo-random binary sequence is used. Such sequences have the property of having an autocorrelation that is substantially a unit spike. Using such sequences, it is possible to determine the channel characteristics.

Figure 8:
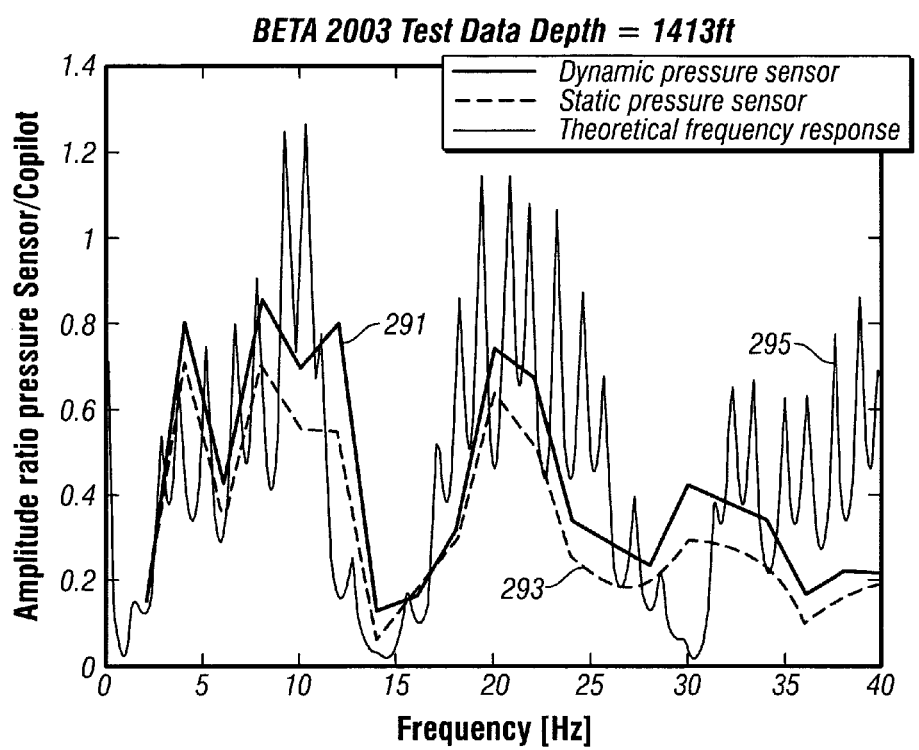
FIG. 8 shows a channel transfer function derived using a stepped frequency signal.

Turning now to FIG. 8, plots of the channel transfer function determined using the stepped frequency method are shown. Curves 291 and 293 correspond to a dynamic pressure sensor and a static pressure sensor. Curve 295 is a theoretical curve estimated from knowledge of the drillstring, wellbore and mud characteristics. The agreement between the theoretical curve and the estimated transfer function is good. They also agree with the FIG. 6 as far as the undesirable bands are concerned around 15 Hz and 28 Hz are concerned.

Figure 9:
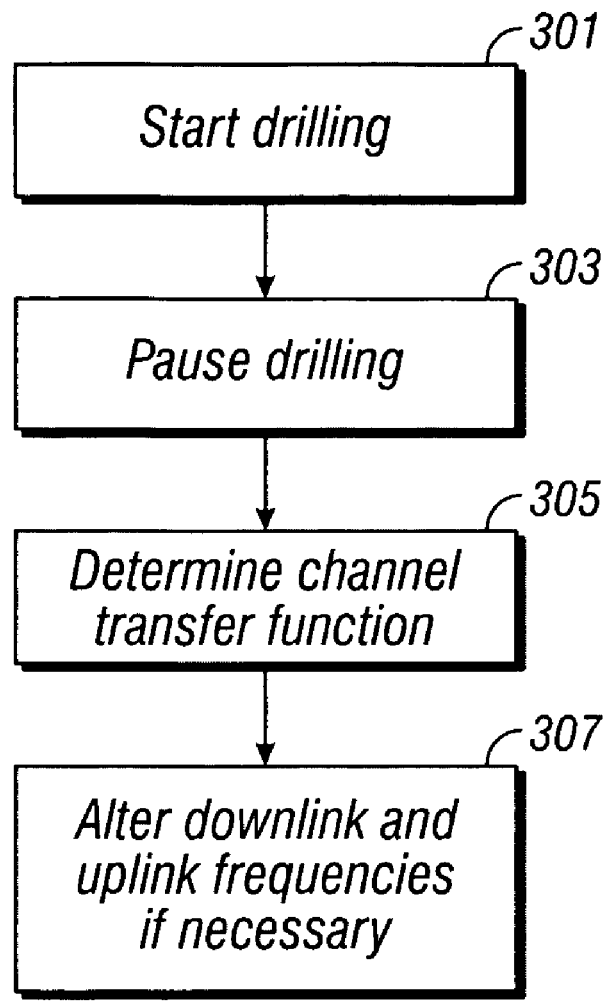
FIG. 9 is a flow chart illustrating use of a method of the present invention during drilling of a borehole.

The use of the channel transfer function determination with telemetry during drilling operations is illustrated by the flow chart of FIG. 9. Drilling is started 301 and concurrently with the drilling operations, downlink telemetry is used for sending instructions downhole and uplink telemetry is used for sending data. The initial choice of frequencies may be based on prior knowledge, or from modeling based on the known physical properties of the drillstring, mud, and borehole. At suitable pauses during 303 drilling operations, such as when adding a new segment of drill pipe, the channel transfer function is determined 305 using any of the methods described above. Based on this determination, the operating frequencies of the downlink and uplink sources may be altered 307. The channel is, in general, not symmetrical because the boundary condition at the pulser end is substantially an open conduit whereas at the surface, the conduit is closed. However, with the use of DPT, it is possible to isolate the upgoing signal (separate from pump noise and the reflected downgoing signal) and to derive a transfer function that may also be applicable to downlink communication. Drilling is then resumed 309. In this fashion, the operating characteristics of the telemetry system are dynamically adjusted based on measured channel characteristics.

In one embodiment of the invention, the receiver is a device responsive to mud flow. This could be a conventional flow meter, or in the context of downlink telemetry, a downhole turbine. Pressure transducers such as hydrophones may be used. For uplink telemetry, as an alternative to or in addition to a single hydrophone, dual pressure transducers (DPT) may be used. Dual pressure transducers comprise at least two spaced apart pressure transducers. The signals from the DPT can be processed to remove signals traveling in a selected direction, such as from a pump. This capability of a DPT makes it more desirable than a single pressure transducer; however, a single pressure transducer could be used in the present invention.

The present invention also addresses a problem that is encountered with any type of mechanical vibrator controlled by a chirp signal, namely harmonic distortion. Simply stated, in addition to generating signals at the frequency of the reference chirp signal, vibrators also generate signals at harmonics (multiples of the fundamental frequency). When the received signal is correlated with the chirp signal, then errors will result if the frequency range of the chirp signal exceeds one octave. A processing methodology that addresses this problem is discussed next.

A chirp signal that is a linear frequency modulated pulse with a start frequency fs and chirp rate γ is denoted as:

$$x_{chirp}(t) = e^{j(\pi\gamma t^2 + 2\pi f_s t)}, \quad 0 \leq t < T_{chirp} \qquad (6).$$

The channel can be considered as a linear FIR filter with complex coefficients $\alpha_i$ and time delays $\tau_i$ (i=1, 2, . . . ).

$$h_{channel}(t) = \sum_{\tau_i} \alpha_i \cdot \delta(t - \tau_i), \tau_0 = 0. \quad (7)$$

The pressure signal at the pulser is assumed to be non-linear and the second harmonic of the chirp signal is attenuated by the factor $\beta$ compared to its fundamental:

$$x_{pulser}(t) = x_{chirp}(t) + \beta \cdot x_{chirp}^2(t) = e^{j(\pi\gamma \cdot t^2 + 2\pi f_s t)} + \beta \cdot e^{j(2\pi\gamma \cdot t^2 + 4\pi f_s t)} \quad (8)$$

The pressure signal at surface is a convolution of the pressure signal with the impulse response of the mud channel:

$$y(t) = \sum_{\tau_i} \alpha_i \cdot x_{pulser}(t - \tau_i), \quad (9)$$

which gives:

$$y(t) = \sum_{\tau_i} \alpha_i \cdot e^{j(\pi\gamma \cdot (t-\tau_i)^2 + 2\pi f_s(t-\tau_i))} + \beta \cdot \sum_{\tau_i} \alpha_i \cdot e^{j(2\pi\gamma \cdot (t-\tau_i)^2 + 4\pi f_s(t-\tau_i))}. \quad (10)$$

We next discuss a "harmonic cancellation." The harmonic cancellation comprises multiplying the received signal with a reference chirp, filtering the resulted signal and multiplying it with the conjugate complex of the reference chirp. The product of a chirp of duration $T_{chirp}$ with its conjugate complex and by $\tau_i$ shifted copy gives:

$$C_{chirp}(t, \tau_i) = x_{chirp}(t - \tau_i) \cdot conj(x_{chirp}(t)) \quad (11)$$

$$= e^{j(\pi\gamma \cdot (t-\tau_i)^2 + 2\pi f_s(t-\tau_i))} e^{-j(\pi\gamma \cdot t^2 + 2\pi f_s t)}$$

$$= \begin{cases} e^{j(-2\pi\gamma \cdot \tau_i \cdot t - 2\pi f_s \cdot \tau_i + \pi\gamma \cdot \tau_i^2)}, & \tau_i \leq t < T_{chirp} \\ 0 & 0 \leq t < \tau_i \end{cases}$$

Figure 10A:
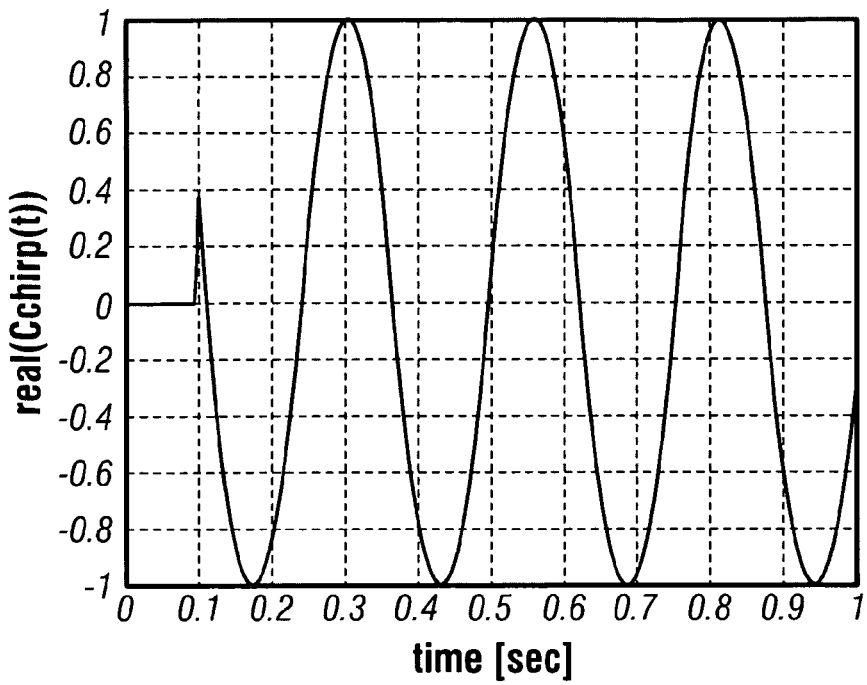
FIGS. 10a and 10b shows the real part of $C_{chirp}(t, \tau_i)$ in the time domain and its FFT respectively.
Figure 10B:
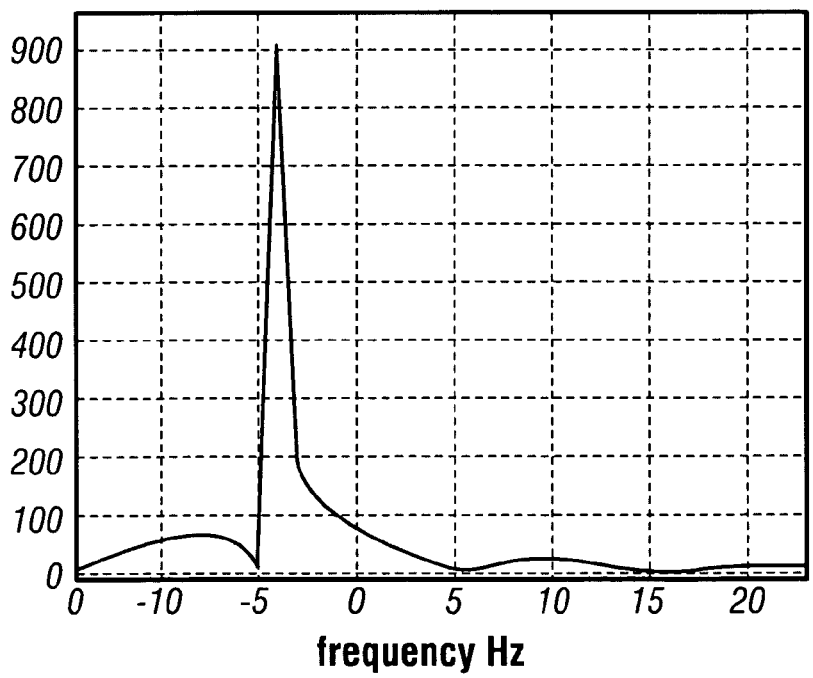

$C_{chirp}(t, \tau_i)$ is an ASK modulated rectangular pulse at the frequency $f_i = -\gamma \cdot \tau_i$, FIGS. 10a and 10b shows the real part of $C_{chirp}(t, \tau_1)$ in the time domain and its FFT respectively.

The reference chirp is the conjugate complex of the transmitted "ideal" chirp signal:

$$x_{ref}(t) = e^{-j(\pi\gamma \cdot t^2 + 2\pi f_s t)} \quad (12).$$

The compressed received signal is:

$$z_{comp}(t) = y(t) \cdot conj(x_{ref}(t)) \quad (13)$$

$$z_{comp}(t, t \geq \tau_i) = \sum_{\tau_i} \alpha_i \cdot e^{j(\pi\gamma \cdot (t-\tau_i)^2 + 2\pi f_s(t-\tau_i))} \cdot e^{-j(\pi\gamma \cdot t^2 + 2\pi f_s t)} + \beta \cdot \sum_{\tau_i} \alpha_i \cdot e^{j(2\pi\gamma \cdot (t-\tau_i)^2 + 4\pi f_s(t-\tau_i))} \cdot e^{-j(\pi\gamma \cdot t^2 + 2\pi f_s t)} \quad (14)$$

$$z_{comp}(t, t \geq \tau_i) = \sum_{\tau_i} \alpha_i \cdot e^{j(-2\pi\gamma \cdot t \cdot \tau_i - 2\pi f_s \tau_i + \pi\gamma \cdot \tau_i^2)} + \beta \cdot \sum_{\tau_i} \alpha_i \cdot e^{j(2\pi\gamma \cdot t^2 - 4\pi\gamma \cdot \tau_i \cdot t + 2\pi\gamma \cdot \tau_i^2 + 2\pi f_s t - 4\pi f_s \tau_i)} \quad (15)$$

-continued $$z_{comp}(t, \tau_i) = \sum_{\tau_i} \alpha_i \cdot e^{-j(2\pi\gamma \cdot \tau_i \cdot t + 2\pi f_s \tau_i - \pi\gamma \cdot \tau_i^2)} + \beta \cdot \sum_{\tau_i} \alpha_i \cdot e^{j(2\pi\gamma \cdot t^2 + 2\pi \cdot (f_s - 2\gamma \cdot \tau_i) \cdot t + 2\pi\gamma \cdot \tau_i^2 - 4\pi f_s \tau_i)} \quad (16)$$

$$z_{comp}(t, \tau_i) = \sum_{\tau_i} \alpha_i \cdot C_{chirp}(t, \tau_i) + \beta \cdot \sum_{\tau_i} \alpha_i \cdot e^{j(2\pi\gamma \cdot t^2 + 2\pi f_s \cdot t)} \cdot C_{chirp}^2(t, \tau_i). \quad (17)$$

The compression of the signal with the reference chirp results in a sum of exponential waves at the frequencies $f_i = -\gamma \tau_i$.

The second part of the last equation represents the compression of the reference chirp with the first harmonic of the chirp. It is a sum of chirp signals with the chirp rate $\gamma$ and start frequencies:

$$f^*_s = f_s - 2\gamma \cdot \tau_i \quad (18).$$

In case of a linear pulser ($\beta=0$), the coefficients $\alpha_i$ and the time delays $\tau_i$ of the channel filter can be directly calculated with the amplitude and the frequencies of the compresses signal $Z_{comp}(t)$, (using FFT, for example). In case of nonlinearity of the transmitter, i.e., where the transmitter is generating harmonics, the spectra of the compressed signals (fundamental and first harmonic) can overlap and impairs the channel estimation. The following condition ensures the non overlap of the two spectra:

$$f_{i,max} < f^*_{s,min} \quad (19)$$

The highest frequency of the delayed chirp signal after compression must be lower than the lowest frequency of the first harmonic after compression, i.e., $$\gamma\tau_{max} < f_s - 2\gamma \cdot \tau_{max} \Rightarrow 3 \cdot \gamma \cdot \tau_{max} < f_s \quad (20)$$

As an example, with $\gamma=40$ Hz/s, $\tau_{max}=0.1$s, then $f_s>12$ Hz. This condition ensures a total non-overlapping of the two spectra. Since the signal energy decreases with increases delays, one can allow an overlap of the two spectra depending on the delay profile of the transmission channel. For example, if the most reflected energy locates within 50% of the maximum delay of 0.1 sec, one can use chirps with a start frequency $f_s=6$ Hz.

After compression, the compressed signal will be filtered by a lowpass filter that takes out the chirp signals that result due to the nonlinearity of the pulser. If the above condition is fulfilled, one gets after filtering the following signal:

$$z_{comp,filt}(t) = \sum_{\tau_i} \alpha_i \cdot C_{chirp}(t, \tau_i). \quad (21)$$

The channel coefficients $\alpha_i$ and the time delays $\tau_i$ can be then determined by transforming the signal $Z_{comp,filt}(t)$ into the frequency domain and detecting the spectra lines (see FIG. 10). The frequency and amplitude of the spectral lines determines the delays and the coefficients. The filtering of the compressed signal reduces not only the effect of the harmonics but also other noise located in the transmitted bandwidth.

After compression and filtering, the signal will be projected onto the reference chirp.

$$z(t) = z_{comp,filt}(t) \cdot x_{ref}(t)$$

$$z(t) = \sum_{\tau_i} \alpha_i \cdot e^{j(\pi\gamma \cdot (t-\tau_i)^2 + 2\pi f_s(t-\tau_i))}$$

Figure 11:
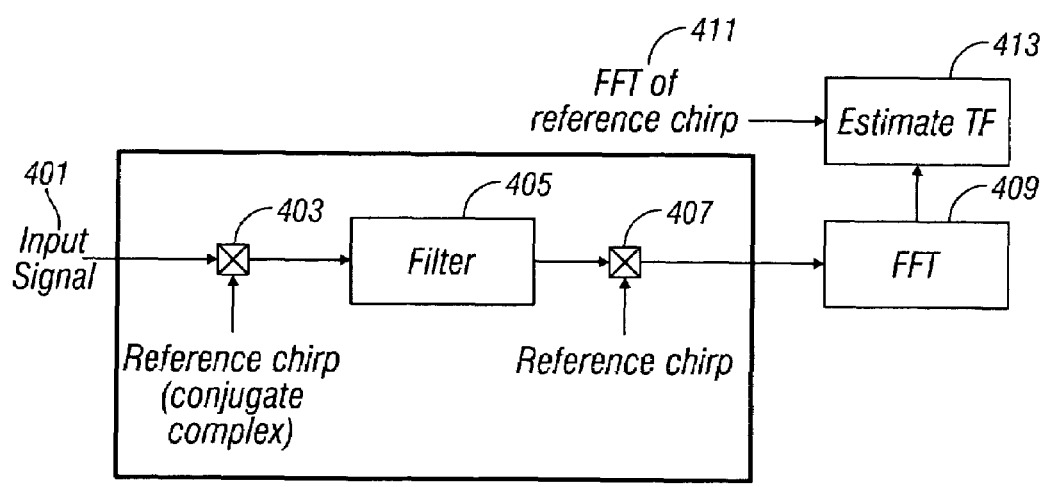
FIG. 11 shows a flow chart of the method of determining channel transfer functions with chirp signals.

The signal z(t) is equal to the received signal y(t) if the pulser is linear and the transmission is noise free. The channel transmission function can then estimated by dividing the Fourier transform of the signal z(t) with the Fourier transform of the reference signal $x_{ref}(t)$. FIG. 11 shows the flow diagram of the channel estimation algorithm.

Shown in FIG. 11 is the input signal 401, which is given by y(t) in eqn. (10). The input signal 401 is compressed (cross-correlated) 403 with the complex conjugate of the reference chirp signal as given in eqns. (13)-(17). This is filtered by a lowpass filter 405 that takes out the chirp signals that result due to the nonlinearity of the pulser. If the condition given by eqn. (20) is satisfied, the result is given by eqn. (21). 407 is the projection of the compressed, filtered signal on to the chirp signal. The operations depicted by 403, 405 and 407 may be referred to as a chirp transformation. The FFT of the chirp transformed output is taken 409 and the transfer function is estimated 413 using the FFT of the reference chirp.

The use of the chirp transform for attenuation of harmonic distortion is not limited to communication in a mud channel with mud pulse telemetry. The problem of harmonic distortion also occurs when a swept frequency source is used in seismic applications, seismic-while-drilling applications (SWD®), and in cross-well tomography. In all these situations, harmonic distortion can be reduced using the method described above. As would be known to those versed in the art, in seismic applications, a mechanical vibrator (on land) and a marine vibrator (in offshore applications) is used for producing a chirp signal that propagates into the earth. Signals detected by receivers disposed on the surface or in a wellbore are cross-correlated with a reference chirp signal to give an impulse response of the earth that is determined by the geometry of subsurface interface s and the elastic properties of the earth. In SWD®, the source may be a mechanical vibrator conveyed by a drillstring on a bottomhole assembly. In cross-well tomography, the sources and the receivers are in boreholes. The earth formation through which the signals propagate may be considered to be a communication channel. As would be known to those versed in the art, the transfer function can be determined from a response to an impulse, but may also be determined from a response to a step function. For the purposes of the present invention, the term "impulse response" is intended to include the term "step response".

The operation of the transmitter and receivers may be controlled by the downhole processor and/or the surface processor. Implicit in the control and processing of the data is the use of a computer program on a suitable machine readable medium that enables the processor to perform the control and processing. The machine readable medium may include ROMs, EPROMs, EAROMs, Flash Memories and Optical disks.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A method of communicating signals in a wellbore between a surface location and a downhole location, the method comprising:
    (a) generating a mechanical signal at one of the surface location and downhole location, the mechanical signal being selected from the group consisting of: (A) a stepped frequency signal, (B) a linear chirp signal, (C) a nonlinear chirp signal, (D) a pseudo-random sequence, and (E) a pseudo-random binary sequence;
    (b) receiving a signal indicative of the generated mechanical signal at the other of the surface and downhole locations; and
    (c) estimating from the received signal and the generated mechanical signal a characteristic of a communication channel between the surface and downhole locations.

2. The method of claim 1 wherein the generated mechanical signal is at least one of: (i) an alteration of a fluid flow, and, (ii) a pressure pulse.

3. The method of claim 1 wherein the received signal comprises a measurement of at least one of: (i) a pressure, and (ii) a fluid flow.

4. The method of claim 1 wherein the generated mechanical signal is generated at the downhole location during a pause in drilling operations.

5. The method of claim 1 wherein the communication channel comprises a mud flow path.

6. The method of claim 1 wherein the characteristic of the communication channel comprises a transfer function.

7. The method of claim 1 wherein estimating the characteristic further comprises at least one of (i) cross-correlating the received signal with the generated mechanical signal, (ii) using a frequency spectrum of the received signal, and, (iii) using a frequency spectrum of the generated mechanical signal.

8. The method of claim 1 further comprising: using the determined characteristic for selecting an operating frequency for communication of at least one of (i) instructions from the surface location to the downhole location, and, (ii) data from the downhole location to the surface location.

9. The method of claim 1 wherein the mechanical signal further comprises a chirp signal, and wherein estimating the characteristic comprises applying a chirp transform to the received signal.

10. The method of claim 9 wherein applying the chirp transform further comprises a low pass filtering based at least in part on a chirp rate of the mechanical signal and a maximum delay in the channel.

11. A system for communicating signals in a wellbore between a surface location and a downhole location, the system comprising:
    (a) a mechanical source configured to generate a mechanical signal at one of the surface location and downhole location, the mechanical signal being selected from the group consisting of: (A) a stepped frequency signal, (B) a linear chirp signal, (C) a nonlinear chirp signal, (D) a pseudo-random sequence, and (E) a pseudo-random binary sequence;
    (b) a receiver configured to produce a signal indicative of the generated mechanical signal at the other of the surface and downhole locations; and
    (c) a processor configured to determine from the received signal and the generated mechanical signal a characteristic of a communication channel between the surface and downhole locations.

12. The system of claim 11 wherein the mechanical source comprises a pulser including an oscillating shear valve.

13. The system of claim 11 wherein generated mechanical signal further comprises at least one of: (i) an alteration of a fluid flow, and, (ii) a pressure pulse.

14. The system of claim 11 wherein the receiver is selected from the group consisting of (i) a hydrophone, (ii) a pressure transducer, (iii) a dual pressure transducer, and (iv) a flow meter.

15. The system of claim 11 wherein the source of the mechanical signal is configured to be downhole and further configured to generate the mechanical signal during a pause in drilling operations.

16. The system of claim 11 wherein the communication channel comprises a mud flow path.

17. The system of claim 11 wherein the characteristic of the communication channel comprises a transfer function.

18. The system of claim 11 wherein processor is configured to determine the characteristic by at least one of: (i) cross-correlating the received mechanical signal with the generated signal, (ii) determining a frequency spectrum of the received signal, and (iii) determining a frequency spectrum of the generated mechanical signal.

19. The system of claim 11 wherein the processor is further configured to use the determined characteristic for selecting an operating frequency for communication of at least one of (i) instructions from the surface location to the downhole location, and (ii) data from the downhole location to the surface location.

20. The system of claim 11 wherein the processor is configured to be at the downhole location.

21. The system of claim 11 wherein the mechanical source is configured to be part of a bottomhole assembly (BHA).

22. The system of claim 11 wherein the generated mechanical signal comprises a chirp signal, and wherein the processor is configured to determine the characteristic of the communication channel by applying a chirp transform.

23. A computer readable medium for use with a system for communicating signals in a wellbore between a surface location and a downhole location, the system comprising:
(a) a mechanical source which generates a mechanical signal at one of the surface location and downhole location, the mechanical signal being selected from the group consisting of: (A) a stepped frequency signal, (B) a linear chirp signal, (C) a nonlinear chirp signal, (D) a pseudo-random sequence, and (E) a pseudo-random binary sequence;
(b) a receiver configured to produce a signal indicative of the generated mechanical signal at the other of the surface and downhole locations;
the medium further comprising instructions which enable a processor to estimate from the received signal and the generated mechanical signal a characteristic of the communication channel between the surface and downhole locations.

24. The computer readable medium of claim 23 further comprising at least one of (i) a ROM, (ii) an EPROM, (iii) an EAROM, (iv) a flash memory, and (v) an optical disk.

25. A method of determining a characteristic of a communication channel associated with an earth formation, the method comprising:
(a) using a mechanical device for generating a swept frequency signal which propagates in the channel, the propagating signal including a harmonic distortion;
(b) receiving the propagating signal at least one receiver to produce a received signal responsive to the characteristic of the channel;
(c) processing the received signal to estimate the characteristic of the channel, the processing including the use of a chirp transform.

26. The method of claim 25 wherein the communication channel further comprises a borehole in the earth formation.

27. The method of claim 25 wherein the characteristic further comprises an impulse response of the channel.

28. The method of claim 25 further comprising positioning the mechanical device at a location selected from (i) a surface location, (ii) within a body of water, (iii) within a borehole in the earth formation, (iv) on a bottomhole assembly conveyed in a borehole in the earth formation.

29. The method of claim 25 further comprising positioning the at least one receiver at a location selected from (i) a surface location, (ii) within a body of water, (iii) within a borehole in the earth formation, and (iv) on a bottomhole assembly conveyed in a borehole in the earth formation.

30. The method of claim 25 wherein the chirp transform further comprises:
(i) a correlation with a conjugate of the swept frequency signal;
(ii) a low pass filtering; and
(iii) a correlation with the swept frequency signal.

31. The method of claim 30 further comprising selecting a parameter of the low pass filtering based at least in part on a chirp rate of the swept frequency signal and a maximum delay in the channel.

32. A system for determining a characteristic of a communication channel associated with an earth formation, the system comprising:
(a) a mechanical device configured to generate a swept frequency signal which propagates in the channel, the propagating signal including a harmonic;
(b) a receiver configured to produce a signal responsive to the propagating signal;
(c) a processor configured to estimate the characteristic of the channel from the produced signal using a processing which includes the use of a chirp transform.

33. The system of claim 32 wherein the communication channel further comprises a borehole in the earth formation.

34. The system of claim 32 wherein the mechanical device is configured to be positioned at a location selected from (i) a surface location, (ii) within a body of water, (iii) within a borehole in the earth formation, (iv) on a bottomhole assembly conveyed in a borehole in the earth formation.

35. The system of claim 32 wherein the receiver is configured to be positioned at a location selected from (i) a surface location, (ii) within a body of water, (iii) within a borehole in the earth formation, and (iv) on a bottomhole assembly conveyed in a borehole in the earth formation.

36. The system of claim 32 wherein the characteristic further comprises an impulse response of the channel.

37. The system of claim 36 wherein the processor is configured to apply the chirp transform by further performing:
(i) a correlation with a conjugate of the swept frequency signal;
(ii) a low pass filtering; and
(iii) a correlation with the swept frequency signal.

38. The system of claim 37 wherein the processor is further configured to select a parameter of the low pass filtering based at least in part on a chirp rate of the swept frequency signal and a maximum delay in the channel.

* * * * *